United States Patent
Van et al.

(10) Patent No.: US 9,197,281 B2
(45) Date of Patent: Nov. 24, 2015

(54) METHOD FOR POWER AMPLIFICATION AND ELECTRONIC DEVICE THEREOF

(71) Applicant: Samsung Electronics Co., Ltd., Gyeonggi-do (KR)

(72) Inventors: Ju-Ho Van, Seoul (KR); Hyun-Ju Hong, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 14/593,932

(22) Filed: Jan. 9, 2015

(65) Prior Publication Data

US 2015/0200703 A1    Jul. 16, 2015

(30) Foreign Application Priority Data

Jan. 10, 2014  (KR) .................. 10-2014-0003573

(51) Int. Cl.
 *H04B 1/62* (2006.01)
 *H04L 12/28* (2006.01)

(52) U.S. Cl.
 CPC .............. *H04B 1/62* (2013.01); *H04L 12/2801* (2013.01)

(58) Field of Classification Search
 CPC ....... H03F 2200/451; H03F 1/56; H03F 1/32; H03F 2200/387; H03F 1/3241; H03F 2200/222; H03F 1/3247; H03F 1/3282; H03F 2201/3233; H04B 1/0475; H04B 2001/0425; H04B 1/0458; H04B 2001/0408; H04B 1/62; H04L 27/368
 See application file for complete search history.

(56) References Cited

U.S. PATENT DOCUMENTS

| 2009/0207896 | A1* | 8/2009 | Behzad .................. 375/221 |
| 2013/0027129 | A1* | 1/2013 | Langer .................. 330/127 |
| 2013/0072139 | A1  | 3/2013 | Kang et al. |
| 2013/0137384 | A1  | 5/2013 | Desclos et al. |

FOREIGN PATENT DOCUMENTS

JP    H 09-153849    6/1997

* cited by examiner

Primary Examiner — Curtis Odom

(57) ABSTRACT

An apparatus and method for applying digital pre-distortion (DPD) technology in an electronic device which uses an envelope tracking (ET) method is provided. The electronic device includes an antenna, a modem, a transceiver configured to convert a signal generated in the modem into a radio frequency signal, an ET modulator configured to supply power to a power amplifier based on an amplitude component of the signal generated in the modem, and the power amplifier configured to amplify power of a signal received from the transceiver based on an output signal of the ET modulator. The modem generates a signal by using a DPD) variable corresponding to output impedance of the power amplifier caused by the antenna from among a plurality of DPD variables.

18 Claims, 11 Drawing Sheets

METHOD FOR POWER AMPLIFICATION AND ELECTRONIC DEVICE THEREOF

PRIORITY

The present application is related to and claims priority under 35 U.S.C. §119 to an application filed in the Korean Intellectual Property Office on Jan. 10, 2014 and assigned Serial No. 10-2014-0003573, the contents of which are incorporated herein by reference.

TECHNICAL FIELD

Exemplary embodiments of the present disclosure relate to an apparatus and method for power amplification to reduce degradation in linearity caused by change in impedance.

BACKGROUND

A transmitting end using an Envelope Tracking (ET) method may utilize Digital Pre-Distortion (DPD) technology to enhance linearity of transmission signals caused by power amplification.

The transmitting end using the DPD technology may enhance non-linearity of a power amplifier by linearly distorting transmission signals by using a predetermined DPD variable prior to amplifying power of the transmission signals.

SUMMARY

A transmitting end using the DPD technology generates a DPD variable with reference to output impedance (such as 50Ω) of a power amplifier caused by a network device connected with a Radio Frequency (RF) path. However, when an antenna is connected with the RF path to transmit signals, the output impedance of the power amplifier is changed and thus the transmitting end may suffer from degradation in linearity of power amplification caused by non-linearity of the power amplifier even though the transmitting end uses the DPD technology.

To address the above-discussed deficiencies, it is a primary object to provide an apparatus and method for reducing degradation in linearity caused by power amplification in an electronic device which uses an ET method.

Another object of the present disclosure is to provide an apparatus and method for providing DPD technology based on output impedance of a power amplifier when an electronic device using an ET method transmits signals using an antenna.

Another object of the present disclosure is to provide an apparatus and method for generating a DPD variable based on output impedance of a power amplifier when an electronic device using an ET method transmits signals using an antenna.

Another object of the present disclosure is to provide an apparatus and method for providing DPD technology based on output impedance of a power amplifier corresponding to an antenna phase in an electronic device which uses an ET method.

Another object of the present disclosure is to provide an apparatus and method for generating a DPD variable based on output impedance of a power amplifier corresponding to an antenna phase in an electronic device which uses an ET method.

In a first embodiment, an electronic device is provided. The electronic device includes an antenna. The electronic device also includes a modem configured to generate a signal. The electronic device further includes a transceiver configured to convert the signal generated in the modem into a radio frequency signal. The electronic device includes an Envelope Tracking (ET) modulator configured to supply power to a power amplifier based on an amplitude component of the signal generated in the modem. The power amplifier is configured to amplify power of a signal received from the transceiver based on an output signal of the ET modulator. The modem generates a signal by using a Digital Pre-Distortion (DPD) variable corresponding to output impedance of the power amplifier caused by the antenna from among a plurality of DPD variables.

In a second embodiment, a method for transmitting a signal in an electronic device which uses an ET method is provided. The method includes determining whether an antenna is connected to a transmission path of the electronic device. When the antenna is connected to the transmission path, generating a signal by using a DPD variable corresponding to output impedance of a power amplifier caused by the antenna from among a plurality of DPD variables. The method also includes amplifying power of the signal by using the power amplifier and transmitting the signal.

Other aspects, advantages, and salient features of the disclosure will become apparent to those skilled in the art from the following detailed description, which, taken in conjunction with the annexed drawings, discloses exemplary embodiments of the disclosure.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

Throughout the drawings, like reference numerals will be understood to refer to like parts, components and structures.

DETAILED DESCRIPTION

FIGS. 1 through 9B, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged electronic device. Various examples of the present disclosure will be described herein with reference to the accompanying drawings. In the following description, details of well-known functions or configurations will be omitted when they would obscure the subject matter of the present disclosure. Also, terms used herein may be defined in accordance with the functions of the present disclosure. Therefore, the terms should be understood based on the following description.

Hereinafter, a method for applying Digital Pre-Distortion (DPD) technology in an electronic device which uses an Envelope Tracking (ET) method according to various exemplary embodiments of the present disclosure will be explained.

The electronic device using the ET method according to various exemplary embodiments of the present disclosure includes one or more of a smartphone, a tablet personal computer (PC), a mobile phone, a video phone, an electronic book reader, a desktop PC, a laptop PC, a netbook computer, a Personal Digital Assistant (PDA), a Portable Multimedia Player (PMP), an MP3 player, an accessory, an electronic appcessory, a camera, a wearable device, a wriest watch, a refrigerator, an air conditioner, a cleaner, an artificial intelligence robot, a TV, a Digital Video Disk (DVD) player, a stereo, an oven, a microwave oven, a washing machine, an electronic bracelet, an electronic necklace, an air cleaner, an electronic album, a medical device, a navigation device, a satellite signal receiver, an Event Data Recoder (EDR), a Flight Data Recoder (FDR), a set-top box, a TV box, an electronic dictionary, an automotive infotainment device, electronic equipment for ship, avionics, a security device, electronic clothing, an electronic key, a camcorder, a game console, a Head-Mounted Display (HMD), a flat panel display device, an electronic album, a part of furniture or a building/a structure including an electronic device, an electronic board, an electronic signature receiving device, and a projector. In addition, it is obvious to an ordinary skilled person in the related art that the electronic device according to various exemplary embodiments of the present disclosure is not limited to the above-mentioned devices.

Figure 1:
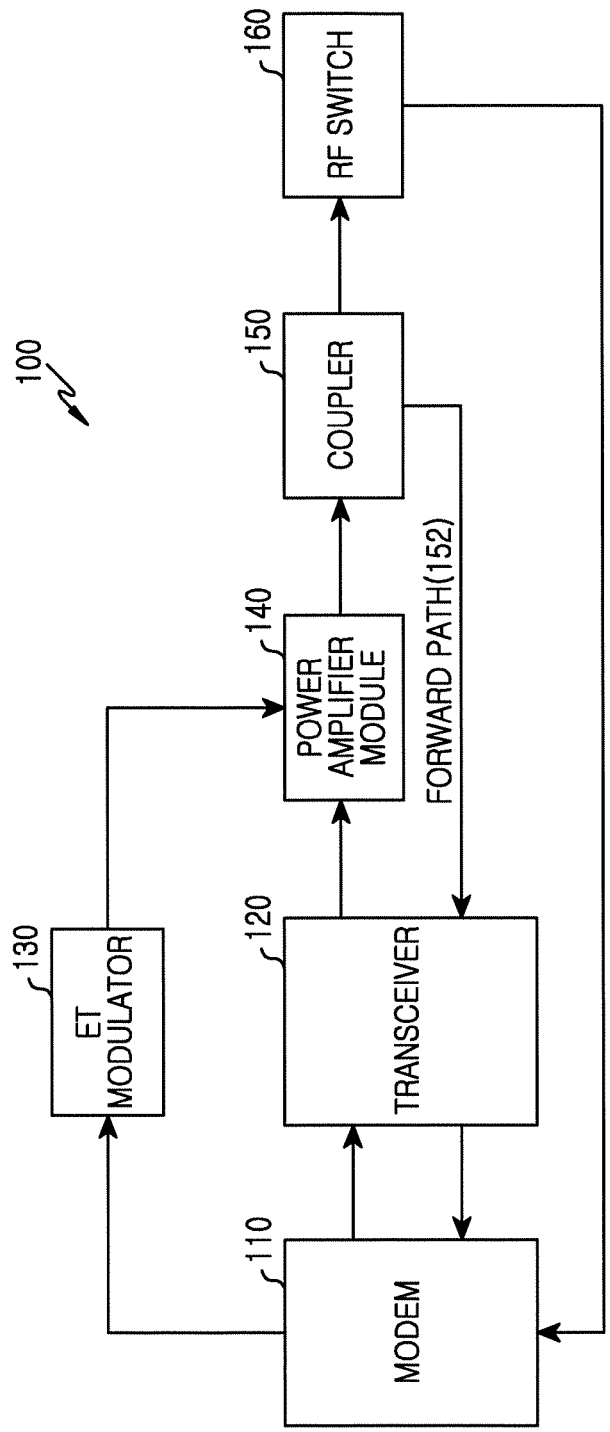
FIG. 1 illustrates a block diagram of an example electronic device according to this disclosure.

FIG. 1 illustrates a block diagram of an electronic device according to an exemplary embodiment of the present disclosure.

Referring to FIG. 1, the electronic device 100 includes a modem 110, a transceiver 120, an ET modulator 130, a Power Amplifier Module (PAM) 140, a coupler 150, and an RF switch 160.

The modem 110 generates DPD variables. For example, the modem 110 generates a transmission signal and transmits the transmission signal to the transceiver 120. The modem 110 generates the DPD variables by comparing the signal transmitted to the transceiver 120 and a feedback signal received from the transceiver 120. The modem 110 generates the DPD variables while classifying the DPD variables according to type based on whether an RF cable is connected to the RF switch 160. For example, the modem 110 generates the DPD variables while classifying the DPD variables into a first DPD variable when a network device for calibration or test is connected to the RF switch 160 via the RF cable and into a second DPD variable when the RF cable is not connected to the RF switch 160. When the RF cable is not connected to the RF switch 160, the modem 110 recognizes that an antenna is connected to a transceiving path of the electronic device 100. Accordingly, the second DPD variable generated when the RF cable is not connected indicates a second DPD variable corresponding to the connection with the antenna.

The modem 110 processes baseband signals transceived in the electronic device 100. For example, the modem 110 demodulates a reception signal which is received via the transceiver 120.

The modem 110 generates a transmission signal and linearly distorts the transmission signal by using a DPD variable. For example, when a network device is connected to the RF switch 160 by using the RF cable, the modem 110 linearly distorts the transmission signal by using a DPD variable corresponding to the connection with the network device. In another example, when the RF cable is not connected to the RF switch 160, the modem 110 linearly distorts the transmission signal by using a DPD variable corresponding to the connection with an antenna.

The modem 110 transmits the transmission signal to the transceiver 120, separate an amplitude component of the transmission signal, and transmit the amplitude component to the ET modulator 130.

The transceiver 120 upwardly modulates the transmission signal received from the modem 110 into an RF signal, and transmits the RF signal to an input end of the power amplifier module 140. When the transceiver 120 receives a feedback signal coupled in the coupler 150 via a forward path 152, the transceiver 120 downwardly modulates the feedback signal into a baseband signal and transmits the baseband signal to the modem 110.

The ET modulator 130 outputs a supply voltage of the power amplifier module 140 based on the amplitude component of the transmission signal received from the modem 110. For example, the output signal of the ET modulator 130 is used as a bias voltage or current of the power amplifier module 140.

The power amplifier module 140 amplify power of the transmission signal received from the transceiver 120 based on the output signal of the ET modulator 130, and output the power.

The coupler 150 monitors the output signal of the power amplifier module 140 and transmits the coupled signal to the transceiver 120 via the forward path 152.

The RF switch 160 connects a network device or antenna to the transceiving path of the electronic device 100. For example, the RF switch 160 is connected with the RF cable and thus connects a network device connected with the RF cable to the transceiving path of the electronic device 100, or, when the RF cable is not connected, the RF switch 160 connects an antenna to the transceiving path of the electronic device 100.

The RF switch 160 transmits control information indicating a device connected to the RF switch 160 to the modem 110. For example, the RF switch 160 transmits control information indicating whether the RF cable is connected or not to the modem 110. The control information recited herein includes a high voltage or a low voltage. For example, when the modem 110 generates a DPD variable corresponding to the connection with the antenna, a load tuner which indicates an impedance characteristic of the antenna is connected to the RF switch 160.

Figure 2:
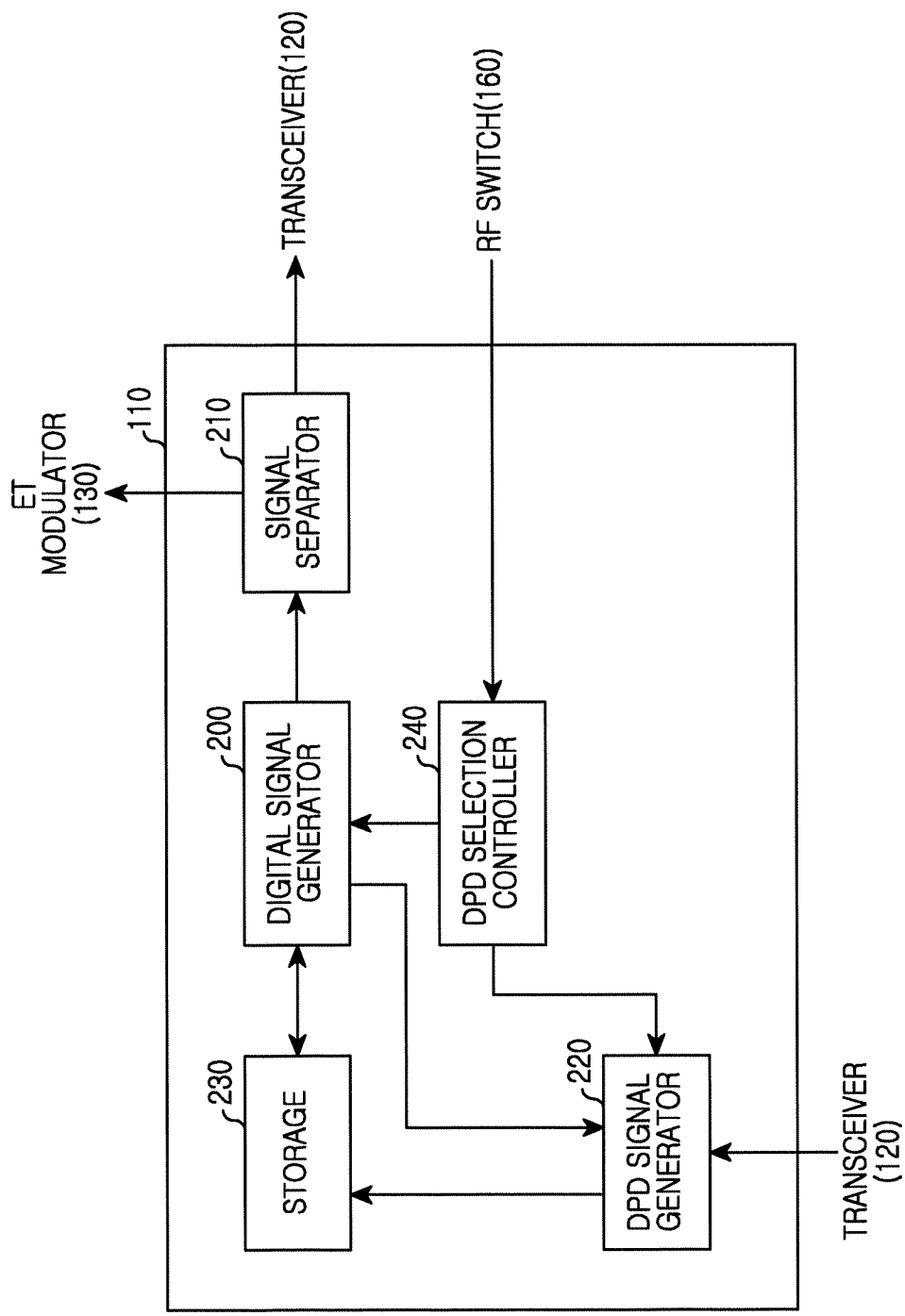
FIG. 2 illustrates a detailed block diagram of an example modem according to this disclosure.

FIG. 2 illustrates a detailed block diagram of an example modem according to this disclosure.

Referring to FIG. 2, the modem 110 includes a digital signal generator 200, a signal separator 210, a DPD signal generator 220, a storage 230, and a DPD selection controller 240.

The digital signal generator 200 generates a transmission signal and linearly distorts the transmission signal by using a DPD variable. For example, the digital signal generator 200 selects a DPD variable to be used to linearly distort the transmission signal under the control of the DPD selection controller 240. For example, when the RF cable is connected to the RF switch 160 and thus a network device is connected to the RF switch 160, the digital signal generator 200 selects a DPD variable corresponding to the connection with the network device in the storage 230 under the control of the DPD selection controller 240. In another example, when signals are transmitted via an antenna, the digital signal generator 200 selects a DPD variable corresponding to the connection with the antenna in the storage 230 under the control of the DPD selection controller 240.

The signal separator 210 separates an amplitude component from the transmission signal received from the digital signal generator 200, and transmits the amplitude component to the ET modulator 130. For example, the signal separator 210 modulates the amplitude component separated from the transmission signal into an analogue signal, and transmits the analogue signal to the ET modulator 130.

The DPD signal generator 220 generates DPD variables by comparing the transmission signal generated by the digital signal generator 200 and a feedback signal received from the transceiver 120. For example, the DPD signal generator 220 determines a type of DPD variable to be generated under the control of the DPD selection controller 240. For example, the DPD signal generator 220 generates a DPD variable corresponding to connection with a network device under the control of the DPD selection controller 240. In another example, the DPD signal generator 220 generates a DPD variable corresponding to the connection with an antenna under the control of the DPD selection controller 240.

The storage 230 store the DPD variables generated in the DPD signal generator 220. In this case, the storage 230 store the DPD variables while classifying the DPD variables according to type. For example, the storage 230 store the DPD variables by classifying the DPD variables into DPD variables (path 1) corresponding to the connection with a network device and DPD variables (path 2) corresponding to the connection with an antenna as shown in table 1.

TABLE 1

| Index | AMAM path 1 | AMAM path 2 | AMPM path 1 | AMPM path 2 |
|---|---|---|---|---|
| 1 | 4114 | 4391 | 1321 | 1422 |
| 2 | 8228 | 8784 | 1319 | 1420 |
| 3 | 12261 | 13092 | 1128 | 1263 |
| 4 | 15952 | 16855 | 708 | 789 |
| 5 | 19465 | 20586 | 417 | 521 |
| 6 | 23011 | 24285 | 160 | 331 |
| 7 | 26462 | 27975 | 97 | 324 |
| 8 | 30058 | 31815 | 73 | 301 |
| 9 | 33892 | 35838 | 77 | 248 |
| 10 | 38039 | 39956 | 61 | 144 |
| 11 | 42233 | 44032 | 39 | 15 |
| 12 | 46577 | 48154 | −44 | −150 |
| 13 | 51121 | 52347 | −137 | −293 |
| 14 | 55739 | 56640 | −172 | −366 |
| 15 | 60379 | 60884 | −224 | −437 |
| 16 | 65535 | 65535 | −271 | −514 |

In another example, the storage 230 stores DPD variables (path 1) corresponding to the connection with a network device and a difference (offset) between the DPD variable corresponding to the connection with the network device and a DPD variable corresponding to connection with an antenna as shown in Table 2.

TABLE 2

| Index | AMAM path 1 | AMAM offset | AMPM path 1 | AMPM offset |
|---|---|---|---|---|
| 1 | 4114 | −277 | 1321 | −101 |
| 2 | 8228 | −556 | 1319 | −101 |
| 3 | 12261 | −831 | 1128 | −141 |
| 4 | 15952 | −903 | 708 | −81 |
| 5 | 19465 | −1121 | 417 | −104 |
| 6 | 23011 | −1274 | 160 | −171 |
| 7 | 26462 | −1513 | 97 | −227 |
| 8 | 30058 | −1757 | 73 | −228 |
| 9 | 33892 | −1946 | 77 | −171 |
| 10 | 38039 | −1917 | 61 | −83 |
| 11 | 42233 | −1799 | 39 | 24 |
| 12 | 46577 | −1577 | −44 | 106 |
| 13 | 51121 | −1226 | −137 | 156 |
| 14 | 55739 | −901 | −172 | 194 |
| 15 | 60379 | −505 | −224 | 213 |
| 16 | 65535 | 0 | −271 | 243 |

The DPD selection controller 240 determines a type of DPD variable based on control information received from the RF switch 160. For example, the DPD selection controller 240 determines the type of DPD variable based on a voltage characteristic received from the RF switch 160. The control information recited herein indicates whether an RF cable is connected to the RF switch 160.

In the above-described exemplary embodiment, the electronic device 100 generates the DPD variables by using the modem 110 and stores the DPD variables.

In another exemplary embodiment, the electronic device 100 includes a separate control module to generate and store DPD variables.

Figure 3:
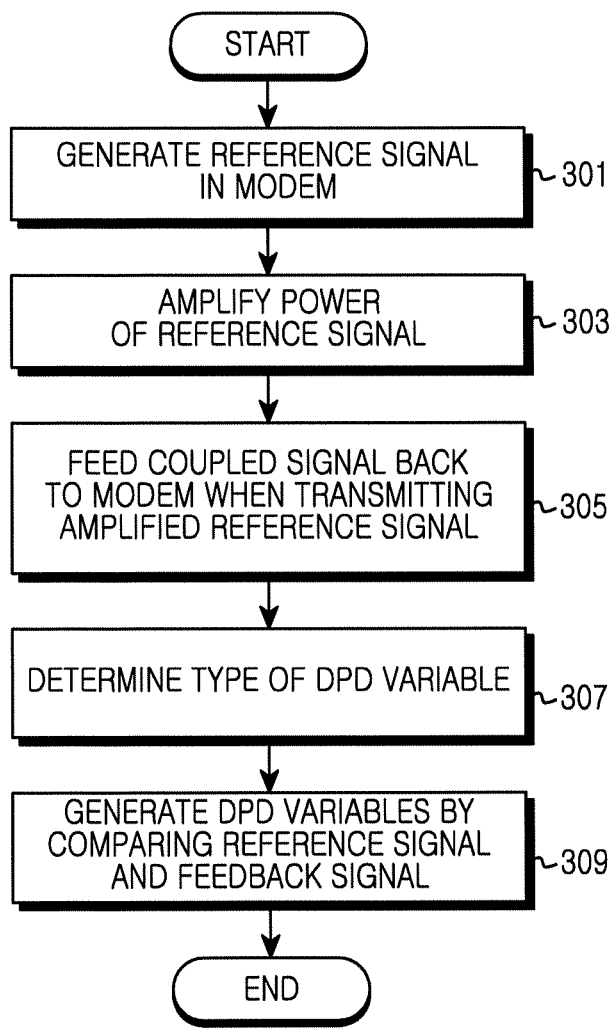
FIG. 3 illustrates a flowchart showing an example procedure for generating a DPD component in an electronic device according to this disclosure.

FIG. 3 illustrates a flowchart showing an example procedure for generating a DPD component in an electronic device according to this disclosure.

Referring to FIG. 3, the electronic device generates a transmission signal in step 301. For example, the electronic device 100 generates the transmission signal by using the modem 110.

The electronic device amplifies power of the transmission signal in step 303. For example, the power amplifier module

140 of the electronic device 100 amplifies the power of the transmission signal which is converted into an RF signal in the transceiver 120 based on an output signal which is modulated from an amplitude component in the ET modulator 130.

The electronic device feeds a signal (such as a coupled transmission signal) which is coupled by the coupler 150 located between the power amplifier module 140 and the RF switch 160 back to the modem at step 305. For example, the coupler 150 of the electronic device 100 feeds the coupled signal back to the transceiver 120 via the forward path 152. The transceiver 120 downwardly modulates the feedback signal received via the forward path 152 into a baseband signal and transmits the baseband signal to the modem 110.

The electronic device determines a type of DPD variable based on whether an RF cable is connected to the RF switch or not in step 307. For example, the modem 110 of the electronic device 100 determines whether the RF cable is connected or not based on control information received from the RF switch 160. The control information recited herein includes voltage characteristic information corresponding to whether the RF cable is connected to the RF switch 160.

The electronic device generates DPD variables by comparing the transmission signal and the feedback signal in step 309. For example, the electronic device generates the DPD variable according to the DPD type determined in step 307 by comparing the transmission signal and the feedback signal.

When the DVD variables are generated as described above, the electronic device stores the DPD variables while classifying the DPD variables according to type as shown in Table 1 or 2.

Figure 4:
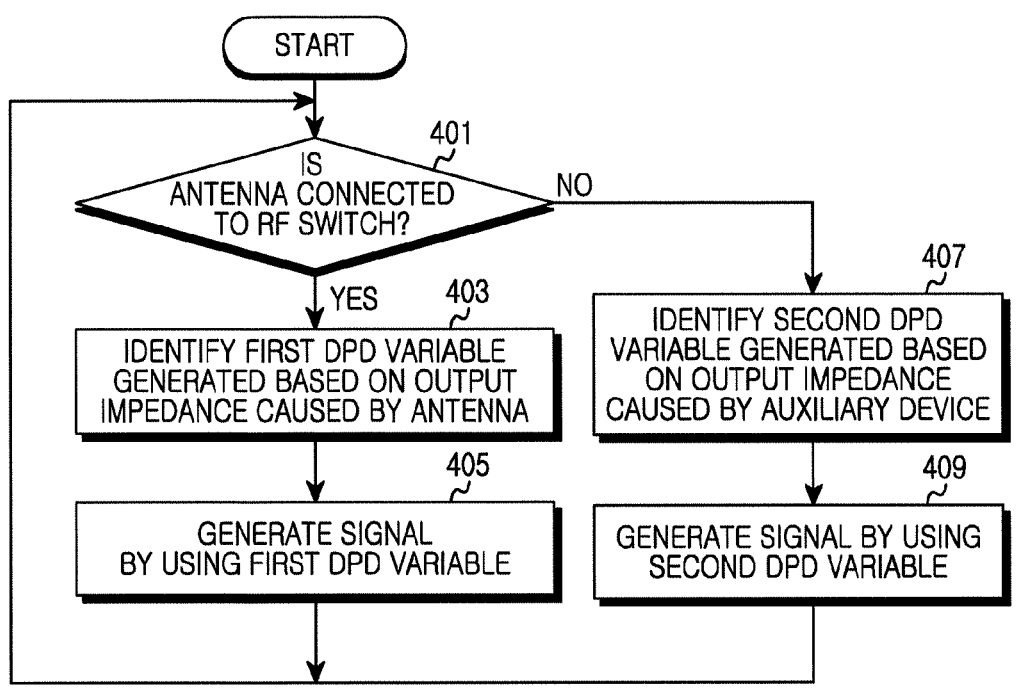
FIG. 4 illustrates a flowchart showing an example procedure for using a DPD variable selectively in an electronic device according to this disclosure.

FIG. 4 illustrates a flowchart showing an example procedure for using a DPD variable selectively in an electronic device according to this disclosure.

Referring to FIG. 4, the electronic device determines whether an antenna is connected to the RF switch in step 401. For example, the modem 110 of the electronic device 100 determines whether the antenna is connected to the RF switch 160 based on control information received from the RF switch 160. The control information recited herein includes voltage characteristic information corresponding to whether an RF cable is connected to the RF switch 160. For example, when the RF cable is not connected to the RF switch 160, the modem 110 recognizes that an antenna is connected to the RF switch 160.

When the antenna is connected to the RF switch, the electronic device identifies a first DPD variable corresponding to output impedance which is caused by the connection with the antenna from among the DPD variables stored in the storage in step 403. For example, when DPD variables (path 1) corresponding to connection with a network device and DPD variables (path 2) corresponding to connection with an antenna are stored as shown in table 1, the modem 110 of the electronic device 100 selects a DPD variable (path 2) corresponding to the connection with the antenna. In another example, when DPD variables (path 1) corresponding to the connection with a network device and a difference (offset) between DPD variables are stored as shown in table 2, the modem 110 of the electronic device 100 calculates a DPD variable corresponding to the connection with the antenna by selecting a DPD variable (path 1) corresponding to the connection with a network device and a difference between the DPD variables.

The electronic device generates a transmission signal by using the first DPD variable in step 405. For example, the modem 110 of the electronic device 100 linearly distorts the transmission signal which is generated to be transmitted via the antenna based on the first DPD variable.

When the antenna is not connected to the RF switch in step 401, the electronic device recognizes that a network device is connected to the RF switch by using an RF cable. Accordingly, the electronic device identifies a second DPD variable which is generated based on output impedance caused by the connection with the network device from among the DPD variables stored in the storage in step 407. For example, when DPD variables are stored as shown in table 1 or 2, the modem 110 of the electronic device 100 selects a DPD variable (path 1) corresponding to the connection with the network device.

When the first DPD variable generated based on the output impedance caused by the connection with the network device is identified, the electronic device generates a transmission signal by using the second DPD variable in step 409. For example, the modem 110 of the electronic device 100 generates the transmission signal and linearly distorts the transmission signal based on the second DPD variable.

Figure 5A:
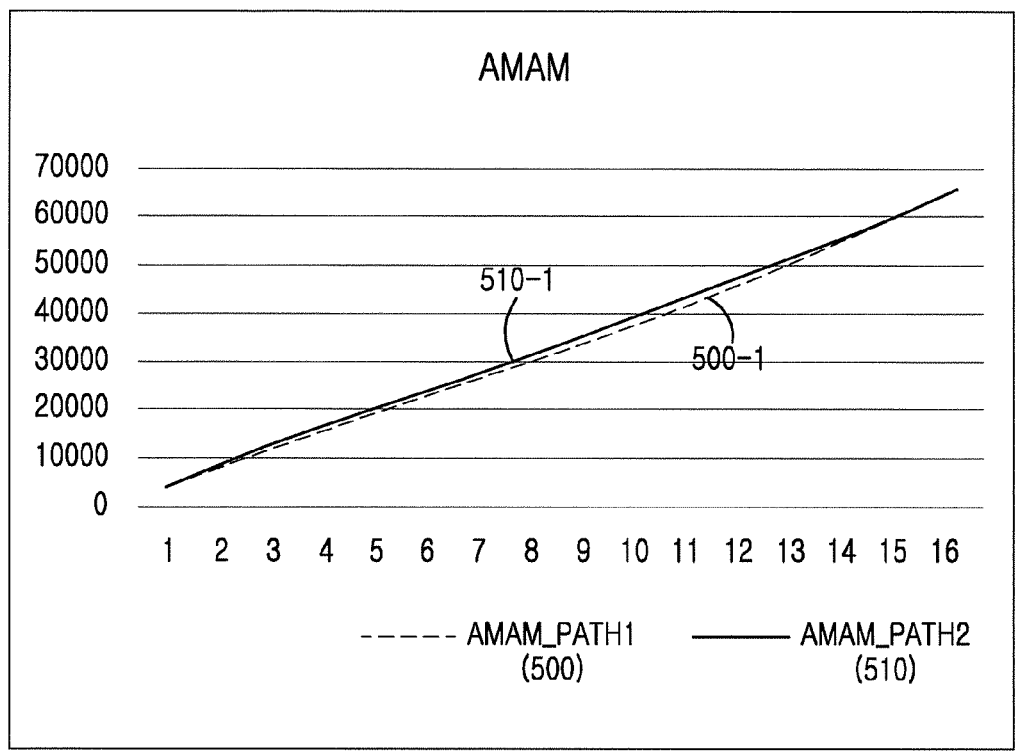
FIGS. 5A and 5B illustrate graphs showing change in performance of an example ET power amplifier according to this disclosure.
Figure 5B:
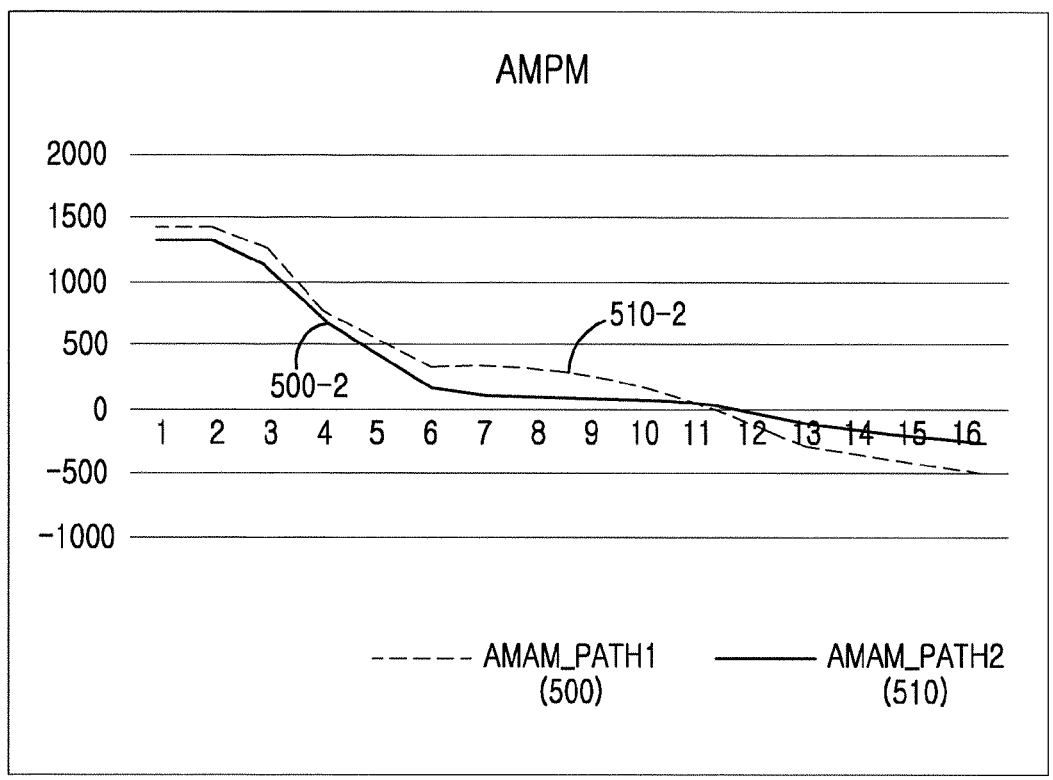

FIGS. 5A and 5B illustrate graphs showing change in performance of an example ET power amplifier according to this disclosure. In the following descriptions, FIG. 5A illustrates a characteristic of a size of an output signal to a size of an input signal of the power amplifier module 140 (Amplitude Modulation Amplitude Modulation (AMAM)), and FIG. 5B illustrates a characteristic of a phase of an output signal to a size of an input signal of the power amplifier module 140 (Amplitude Modulation Phase Modulation (AMPM)).

Referring to FIG. 5A, when a transmission signal is generated by using a DPD variable (path 2) corresponding to output impedance of the power amplifier module caused by the connection with an antenna (510-1), degradation in linearity caused by power amplification is reduced in comparison with the case in which a transmission signal is generated by using a DPD variable (path 1) corresponding to output impedance caused by the connection with a network device (500-1).

Referring to FIG. 5B, when a transmission signal is generated by using a DPD variable (path 2) corresponding to output impedance of the power amplifier module caused by the connection with an antenna (510-2), degradation in linearity caused by power amplification is reduced in comparison with the case in which a transmission signal is generated by using a DPD variable (path 1) corresponding to output impedance caused by the connection with a network device (500-2).

Figure 6:
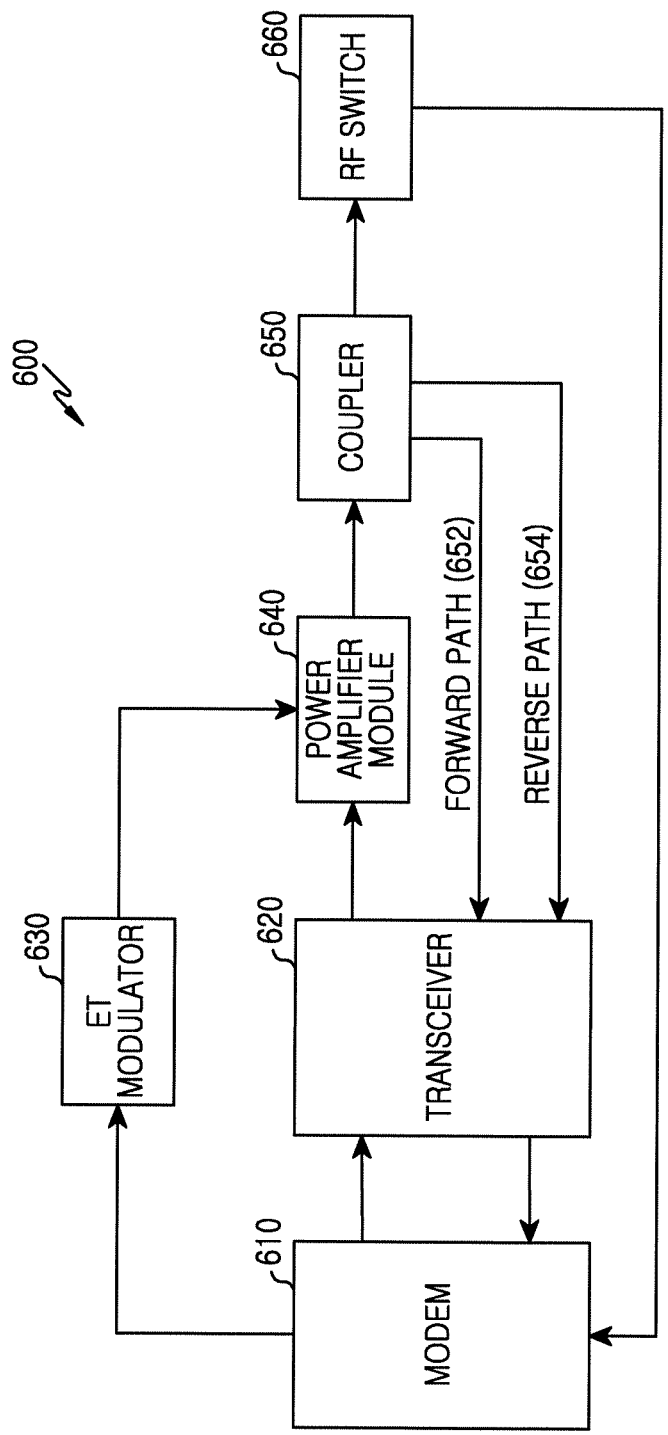
FIG. 6 illustrates a block diagram of an example electronic device according to this disclosure.

FIG. 6 illustrates a block diagram of an example electronic device according to this disclosure.

Referring to FIG. 6, the electronic device 600 includes a modem 610, a transceiver 620, an ET modulator 630, a Power Amplifier Module (PAM) 640, a coupler 650, and an RF switch 660.

The modem 610 generates DPD variables. For example, the modem 610 generates a transmission signal and transmits the transmission signal to the transceiver 620. The modem 610 generates the DPD variables by comparing the signal transmitted to the transceiver 620 and a feedback signal received from the transceiver 620. The modem 610 generates the DPD variables while classifying the DPD variables according to type based on whether an RF cable is connected to the RF switch 660. For example, the modem 610 generates the DPD variables while classifying the DPD variables into a first DPD variable when a network device is connected to the RF switch 560 via the RF cable and into a second DPD variable when the RF cable is not connected to the RF switch 660. When the RF cable is not connected to the RF switch 660, the modem 610 recognizes that an antenna is connected to a transceiving path of the electronic device 600. Accordingly, the second DPD variable generated when the RF cable is not connected indicates a second DPD variable corresponding to the connection with the antenna.

The modem 610 processes baseband signals transceived in the electronic device 600. For example, the modem 610 demodulates a reception signal which is received via the transceiver 620.

The modem 610 generates a transmission signal and linearly distorts the transmission signal by using a DPD variable. For example, when a network device is connected to the RF switch 660 by using the RF cable, the modem 610 linearly distorts the transmission signal by using a DPD variable corresponding to the connection with the network device. In another example, when the RF cable is not connected to the RF switch 660, the modem 610 recognizes that an antenna is connected to the RF switch 660. Accordingly, the modem 610 detects a phase of the antenna by using a feedback signal received from the transceiver 620. The modem 610 linearly distorts the transmission signal by using a DPD variable corresponding to the phase of the antenna from among the DPD variables corresponding to the connection with the antenna.

The modem 610 transmits the transmission signal to the transceiver 620, separate an amplitude component of the transmission signal, and transmit the amplitude component to the ET modulator 630.

The transceiver 620 upwardly modulates the transmission signal received from the modem 610 into an RF signal, and transmits the RF signal to an input end of the power amplifier module 140. When the transceiver 620 receives at least one feedback signal coupled in the coupler 650 via at least one of a forward path 652 and a reverse path 654, the transceiver 620 downwardly modulates the feedback signal into a baseband signal and transmits the baseband signal to the modem 610.

The ET modulator 630 outputs a supply voltage of the power amplifier module 640 based on the amplitude component of the transmission signal received from the modem 610. For example, the output signal of the ET modulator 630 is used as a bias voltage or current of the power amplifier module 640.

The power amplifier module 640 amplifies power of the transmission signal received from the transceiver 620 based on the output signal of the ET modulator 630, and outputs the power.

The coupler 650 monitors the output signal of the power amplifier module 640 and transmits the signal which is coupled by mismatch between an output of the power amplifier module 640 and the antenna to the transceiver 620 via the forward path 652. In addition, the coupler 650 monitors the reception signal received via the antenna and transmits the signal which is coupled by mismatch between the reception path and the antenna to the transceiver 620 via the reverse path 654.

The RF switch 660 connects a network device or antenna to a transceiving path of the electronic device 600. For example, the RF switch 660 is connected with the RF cable and thus connects a network device connected with the RF cable to the transceiving path of the electronic device 600, or, when the RF cable is not connected, the RF switch 660 connects an antenna to the transceiving path of the electronic device 600.

The RF switch 660 transmits control information indicating a device connected to the RF switch 660 to the modem 610. For example, the RF switch 660 transmits control information indicating whether the RF cable is connected or not to the modem 610. The control information includes a high voltage or a low voltage. For example, when the modem 610 generates a DPD variable corresponding to the connection with the antenna, a load tuner which indicates an impedance characteristic according to change in the phase of the antenna is connected to the RF switch 660.

Figure 7:
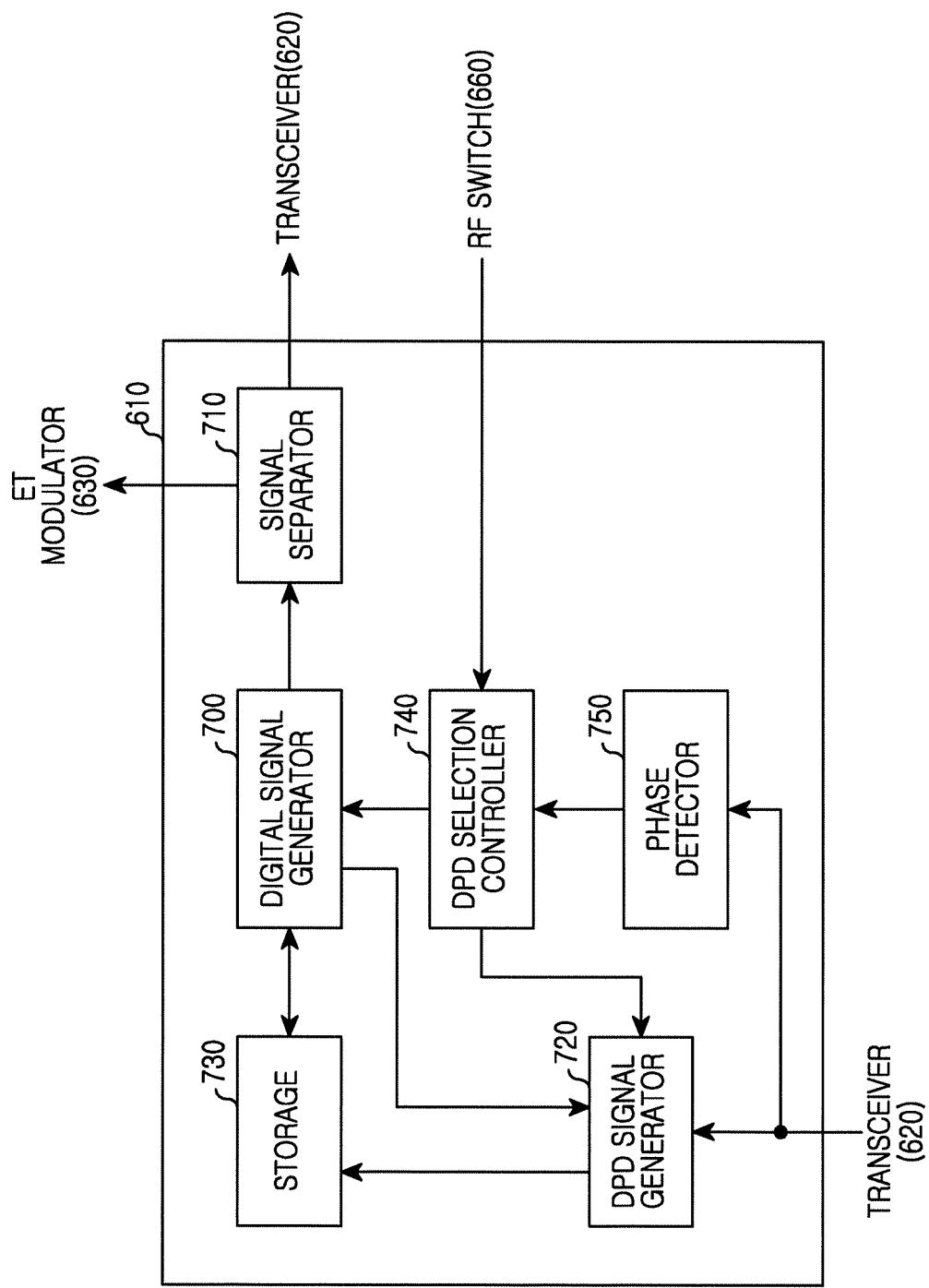
FIG. 7 illustrates a detailed block diagram of an example modem according to this disclosure.

FIG. 7 illustrates a detailed block diagram of an example modem according to this disclosure.

Referring to FIG. 7, the modem 610 includes a digital signal generator 700, a signal separator 710, a DPD signal generator 720, a storage 730, a DPD selection controller 740, and a phase detector 750.

The digital signal generator 700 generates a transmission signal and linearly distorts the transmission signal by using a DPD variable. For example, the digital signal generator 700 selects a DPD variable to be used to linearly distort the transmission signal under the control of the DPD selection controller 740. For example, when calibration is performed, the digital signal generator 700 selects a DPD variable corresponding to the connection with a network device in the storage 730 under the control of the DPD selection controller 740. In another example, when signals are transmitted via an antenna, the digital signal generator 700 selects a DPD variable according to a phase of the antenna in the storage 730 under the control of the DPD selection controller 740.

The signal separator 710 separates an amplitude component from the transmission signal received from the digital signal generator 700, and transmits the amplitude component to the ET modulator 630. For example, the signal separator 710 modulates the amplitude component separated from the transmission signal into an analogue signal, and transmits the analogue signal to the ET modulator 630.

The DPD signal generator 720 generates DPD variables by comparing the transmission signal generated by the digital signal generator 700 and a feedback signal received from the transceiver 620. For example, the DPD signal generator 720 determines a type of DPD variable to be generated under the control of the DPD selection controller 740. For example, the DPD signal generator 720 generates a DPD variable corresponding to the connection with a network device under the control of the DPD selection controller 740. In another example, the DPD signal generator 720 generates at least one DPD variable corresponding to the connection with an antenna under the control of the DPD selection controller 740. In this case, the DPD generator 720 generates a DPD variable for each phase of the antenna.

The storage 730 stores the DPD variables generated in the DPD signal generator 720. In this case, the storage 730 stores the DPD variables while classifying the DPD variables according to type. For example, the storage 730 stores the DPD variables by classifying the DPD variables into DPD variables (path 1) corresponding to the connection with a network device and DPD variables (path 2) corresponding to the connection with an antenna as shown in table 3.

TABLE 3

| | AMAM | | | | | AMPM | | | | |
| --- | --- | --- | --- | --- | --- | --- | --- | --- | --- | --- |
| Index | path 1 | path2_30° | path2_135° | path2_225° | path2_315° | path1 | path2_30° | path2_135° | path2_225° | path2_315° |
| 1 | 4114 | 4391 | 4410 | 4548 | 4192 | 1321 | 1422 | 1442 | 1681 | 1101 |
| 2 | 228 | 784 | 8824 | 9096 | 8386 | 1319 | 1420 | 1440 | 1679 | 1099 |

TABLE 3-continued

| | AMAM | | | | | AMPM | | | | |
|---|---|---|---|---|---|---|---|---|---|---|
| Index | path 1 | path2__30° | path2__135° | path2__225° | path2__315° | path1 | path2__30° | path2__135° | path2__225° | path2__315° |
| 3 | 2261 | 3092 | 13133 | 13435 | 12525 | 1128 | 1269 | 1246 | 1485 | 931 |
| 4 | 5952 | 6855 | 16883 | 17317 | 16375 | 708 | 789 | 8040 | 1086 | 584 |
| 5 | 9465 | 0586 | 20610 | 1238 | 20034 | 417 | 521 | 528 | 87 | 229 |
| 6 | 3011 | 4285 | 24327 | 5073 | 23611 | 160 | 331 | 353 | 705 | 54 |
| 7 | 6462 | 7975 | 28032 | 8939 | 27164 | 97 | 324 | 325 | 638 | −29 |
| 8 | 0058 | 1815 | 31841 | 2834 | 30885 | 73 | 301 | 304 | 502 | −36 |
| 9 | 3892 | 5838 | 35889 | 6860 | 34713 | 77 | 248 | 244 | 344 | −5 |
| 10 | 8039 | 9956 | 39977 | 0856 | 38702 | 61 | 144 | 135 | 150 | 20 |
| 11 | 2233 | 4032 | 44078 | 4793 | 42848 | 39 | 15 | 13 | −34 | 44 |
| 12 | 6577 | 8154 | 48187 | 8763 | 47117 | −44 | −150 | −135 | −204 | 22 |
| 13 | 1121 | 2347 | 52428 | 2814 | 51502 | −137 | −293 | −286 | −361 | 0 |
| 14 | 5739 | 6640 | 56642 | 6908 | 55954 | −172 | −366 | −360 | −447 | −48 |
| 15 | 0379 | 0884 | 60989 | 0990 | 60615 | −224 | −437 | −430 | −551 | −147 |
| 16 | 5535 | 5535 | 65535 | 5535 | 65535 | −271 | −514 | −523 | −705 | −270 |

In another example, the storage 730 stores DPD variables (path 1) corresponding to the connection with a network device and a difference (offset) between the DPD variable corresponding to the connection with the network device and a DPD variable corresponding to the connection with an antenna, as shown in Table 4:

TABLE 4

| | AMAM | | | | | AMPM | | | | |
|---|---|---|---|---|---|---|---|---|---|---|
| Index | path 1 | offset__30° | offset__135° | offset__225° | offset__315° | path1 | offset__30° | offset__135° | offset__225° | offset__315° |
| 1 | 4114 | −277 | −296 | −434 | −78 | 1321 | −101 | −121 | −360 | 220 |
| 2 | 228 | −556 | −596 | −868 | −158 | 1319 | −101 | −121 | −360 | 220 |
| 3 | 2261 | −831 | −872 | −1174 | −264 | 1128 | −141 | −118 | −357 | 197 |
| 4 | 5952 | −903 | −931 | −1365 | −423 | 708 | −81 | −96 | −378 | 124 |
| 5 | 9465 | −1121 | −1145 | −1773 | −569 | 417 | −104 | −111 | −460 | 188 |
| 6 | 3011 | −1274 | −1316 | −2062 | −600 | 160 | −171 | −193 | 545 | 106 |
| 7 | 6462 | −1513 | −1570 | −2477 | −702 | 97 | −227 | −228 | 541 | 126 |
| 8 | 0058 | −1757 | −1783 | −2776 | −827 | 73 | −228 | −231 | 429 | 109 |
| 9 | 3892 | −1946 | −1997 | −2968 | −821 | 77 | −171 | −167 | 267 | 82 |
| 10 | 8039 | −1917 | −1938 | −2817 | −663 | 61 | −83 | −74 | 89 | 41 |
| 11 | 2233 | −1799 | −1845 | −2560 | −615 | 39 | 24 | 26 | 3 | −5 |
| 12 | 6577 | −1577 | −1610 | −2186 | −540 | −44 | 105 | 91 | 60 | −66 |
| 13 | 1121 | −1226 | −1307 | −1693 | −381 | −137 | 156 | 149 | 24 | −137 |
| 14 | 5739 | −901 | −903 | −1169 | −215 | −172 | 194 | 188 | 75 | −124 |
| 15 | 0379 | −505 | −610 | −611 | −236 | −224 | 213 | 206 | 27 | −77 |
| 16 | 5535 | 0 | 0 | 0 | 0 | −271 | 243 | 252 | 34 | −1 |

The DPD selection controller 740 determines a type of DPD variable based on control information received from the RF switch 760 and the phase of the antenna detected by the phase detector 750.

The phase detector 750 detects the phase of the antenna connected to the RF switch 660 by using a first feedback signal which is received via the forward path 652 and a second feedback signal which is received via the reverse path 654. For example, the phase detector 750 detects the phase of the antenna connected to the RF switch 660 based on the first feedback signal and the second feedback signal which are modulated into baseband signals and are received from the transceiver 620.

In the above-described exemplary embodiment, the electronic device 600 generates the DPD variables by using the modem 610 and stores the DPD variables.

In another exemplary embodiment, the electronic device 600 includes a separate control module to generate and store DPD variables.

Figure 8:
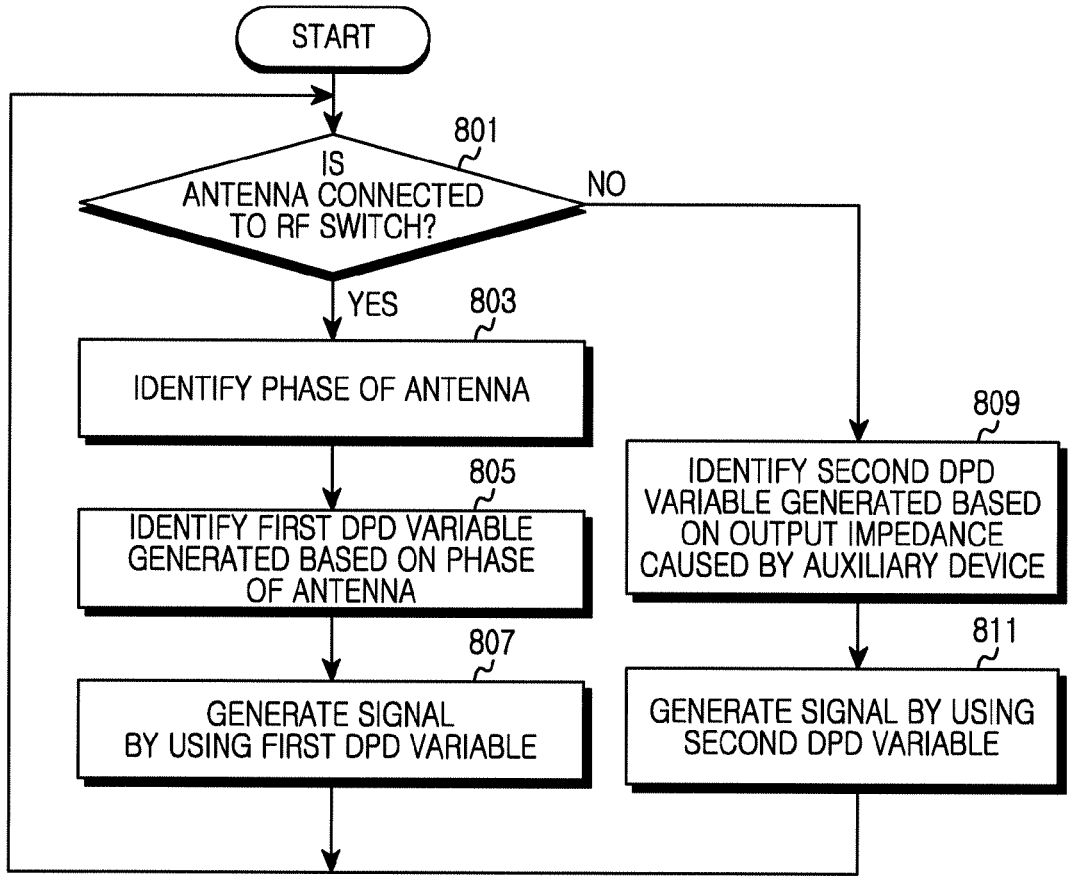
FIG. 8 illustrates a flowchart showing an example procedure for using a DPD variable selectively in an electronic device according to this disclosure.

FIG. 8 illustrates a flowchart showing an example procedure for using a DPD variable selectively in an electronic device according to this disclosure.

Referring to FIG. 8, the electronic device determines whether an antenna is connected to the RF switch in step 801. For example, the modem 610 of the electronic device 600 determines whether the antenna is connected to the RF switch 660 based on control information received from the RF switch 660. The control information includes voltage characteristic information corresponding to whether an RF cable is connected to the RF switch 660. For example, when the RF cable is not connected to the RF switch 660, the modem 610 recognizes that an antenna is connected to the RF switch 660.

When the antenna is connected to the RF switch, the electronic device identifies a phase of the antenna connected to the RF switch in step 803. For example, the modem 610 of the electronic device 600 detects the phase of the antenna connected to the RF switch 660 by using a first feedback signal which is received via the forward path 652 and a second feedback signal which is received via the reverse path 654. For example, the modem 610 detects the phase of the antenna connected to the RF switch 660 based on the first feedback signal and the second feedback signal which are modulated into baseband signals and are received from the transceiver 620.

The electronic device identifies a first DPD variable which is generated based on the phase of the antenna from among the DPD variables corresponding to the connection with the antenna and stored in the storage in step 805.

The electronic device generates a transmission signal by using the first DPD variable in step 807. For example, the modem 610 of the electronic device 600 linearly distorts the transmission signal which is generated to be transmitted via the antenna based on the first DPD variable.

When the antenna is not connected to the RF switch in step 801, the electronic device recognizes that a network device is connected to the RF switch by using an RF cable. Accordingly, the electronic device identifies a second DPD variable corresponding to output impedance caused by the connection with the network device from among the DPD variables stored in the storage in step 809. For example, when the DPD variables are stored as shown in table 3 or 4, the modem 110 of the electronic device 100 calls a DPD variable (path 1) corresponding to the connection with the network device.

The electronic device generates a reference signal by using the second DPD variable in step 811. For example, the modem 610 of the electronic device 600 generates a transmission signal and linearly distorts the transmission signal based on the second DPD variable.

Figure 9A:
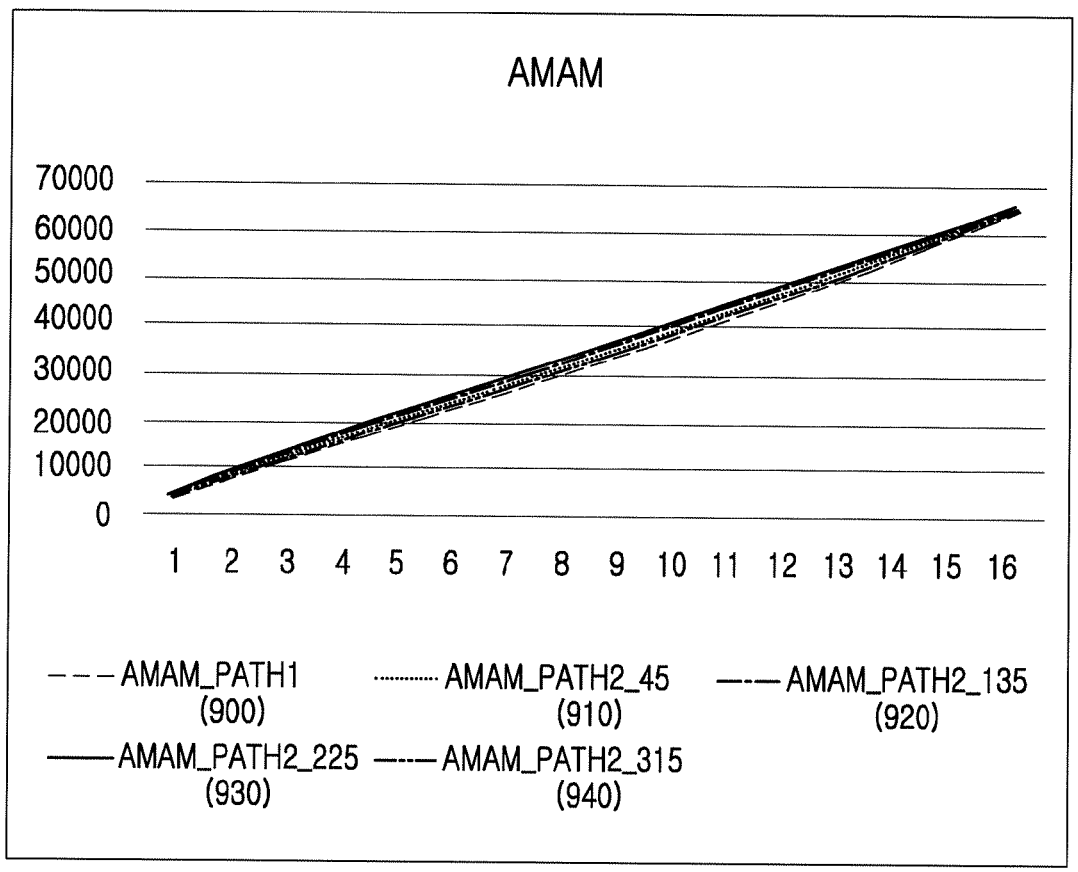
FIGS. 9A and 9B illustrate graphs showing change in performance of an example ET power amplifier according to this disclosure.
Figure 9B:
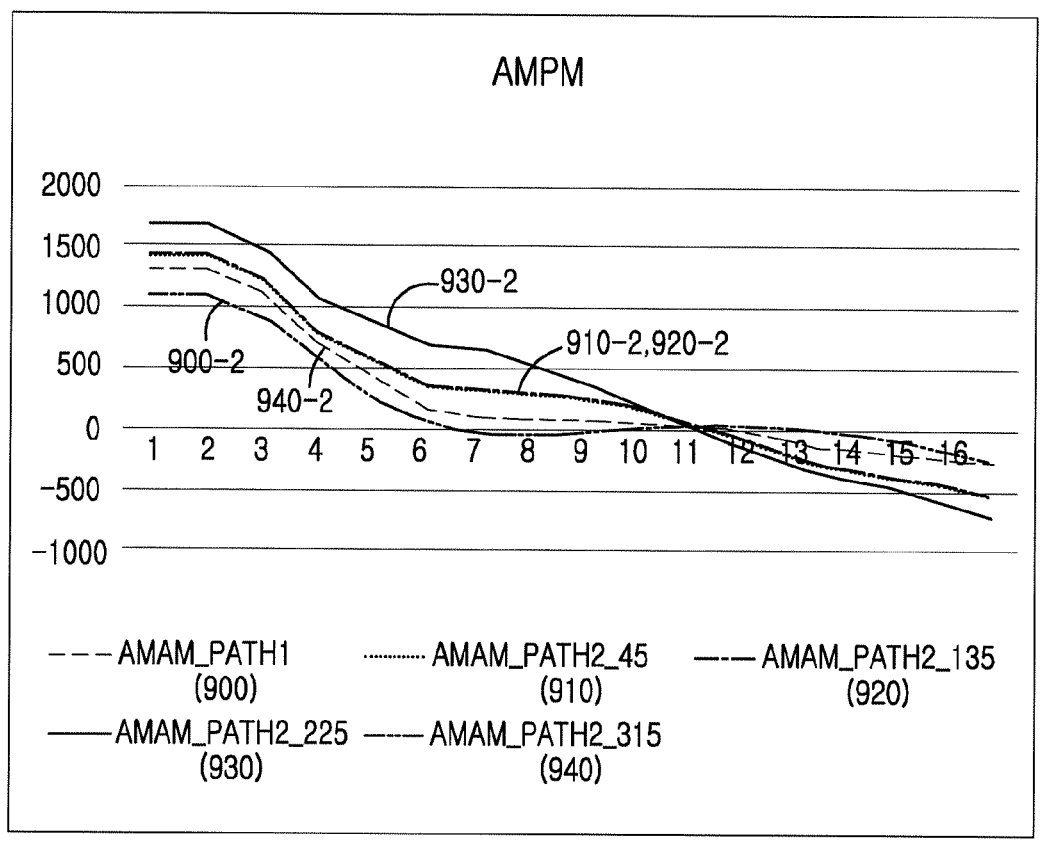

FIGS. 9A and 9B illustrate graphs showing change in performance of an example ET power amplifier according to this disclosure. In the following descriptions, FIG. 9A illustrates a characteristic of a size of an output signal to a size of an input signal of the power amplifier module 640 (Amplitude Modulation Amplitude Modulation (AMAM)), and FIG. 9B illustrates a characteristic of a phase of an output signal to a size of an input signal of the power amplifier module 640 (Amplitude Modulation Phase Modulation (AMPM)).

Referring to FIG. 9A, when a transmission signal is generated by using a DPD variable (path 2) corresponding to output impedance of the power amplifier module caused by the connection with an antenna (910 to 940), degradation in linearity caused by power amplification is reduced in comparison with the case in which a transmission signal is generated by using a DPD variable (path 1) corresponding to output impedance caused by the connection with a network device (900-1).

Referring to FIG. 9B, when a transmission signal is generated by using a DPD variable (path 2) corresponding to output impedance of the power amplifier module caused by the connection with an antenna (910-2 to 940-2), degradation in linearity caused by power amplification is reduced in comparison with the case in which a transmission signal is generated by using a DPD variable (path 1) corresponding to output impedance caused by the connection with a network device (900-2).

The electronic device which uses an ET method according to various exemplary embodiments of the present disclosure reduces degradation in linearity caused by power amplification by linearly distorting a transmission signal by using a DPD variable which is generated with reference to output impedance of a power amplifier module corresponding to the connection with an antenna.

While the disclosure has been shown and described with reference to certain preferred embodiments thereof, it will be understood by those skilled in the art that various changes in form and details is made therein without departing from the spirit and scope of the disclosure as defined by the appended claims. Therefore, the scope of the disclosure is defined not by the detailed description of the disclosure but by the appended claims, and all differences within the scope will be construed as being included in the present disclosure.

What is claimed is:
1. An electronic device comprising:
an antenna;
a modem configured to:
generate a first signal,
determine a digital pre-distortion (DPD) type based on output impedance of a power amplifier,
generate a DPD variable of the determined DPD type by comparing a second signal coupled by a coupler and the first signal generated by the modem, and
generate a third signal by using the DPD variable;
a transceiver configured to convert the first signal generated in the modem into a radio frequency signal;
an envelope tracking (ET) modulator configured to supply power to the power amplifier based on an amplitude component of the first signal generated in the modem; and
the power amplifier configured to amplify power of a fourth signal received from the transceiver based on an output signal of the ET modulator.

2. The electronic device of claim 1, wherein the modem comprises:
a storage configured to store a plurality of DPD variables;
a controller configured to control to select one of the DPD variables corresponding to output impedance of the power amplifier caused by the antenna; and
a signal generator configured to generate the third signal by using the DPD variable selected by the controller from among the plurality of DPD variables stored in the storage.

3. The electronic device of claim 2, wherein the storage is configured to store information on a first DPD variable corresponding to output impedance of the power amplifier caused by a network device for calibration or test, and information on at least one second DPD variable corresponding to output impedance of the power amplifier caused by the antenna.

4. The electronic device of claim 3, wherein the storage is configured to store the information on the second DPD variable in at least one form of the second DPD variable and an offset value between the first DPD variable and the second DPD variable.

5. The electronic device of claim 1, further comprising a radio frequency (RF) switch located between the power amplifier and the antenna, and
wherein the modem is configured to select one of the DPD variables corresponding to output impedance of the power amplifier caused by the RF switch.

6. The electronic device of claim 5, wherein the RF switch is configured to connect the power amplifier and the antenna or connect the power amplifier and a network device for calibration or test.

7. The electronic device of claim 1, further comprising:
an RF switch located between the power amplifier and the antenna;
wherein the coupler is located between the power amplifier and the RF switch and configured to monitor a signal received via the antenna, and
wherein the modem is configured to detect a phase of the antenna by using a signal coupled by the coupler, and select at least one of a plurality of DPD variables based on output impedance of the power amplifier caused by the RF switch and the phase of the antenna.

8. The electronic device of claim 1, wherein the electronic device includes at least one of a smartphone, a tablet personal computer (PC), a mobile phone, a video phone, an electronic book reader, a desktop PC, a laptop PC, a netbook computer, a Personal Digital Assistant (PDA), a Portable Multimedia Player (PMP), an MP3 player, an accessory, an electronic appcessory, a camera, a wearable device, a wrist watch, a refrigerator, an air conditioner, a cleaner, an artificial intelligence robot, a TV, a Digital Video Disk (DVD) player, a stereo, an oven, a microwave oven, a washing machine, an electronic bracelet, an electronic necklace, an air cleaner, an electronic album, a medical device, a navigation device, a satellite signal receiver, an Event Data Recoder (EDR), a Flight Data Recoder (FDR), a set-top box, a TV box, an electronic dictionary, an automotive infotainment device, electronic equipment for a ship, avionics, a security device, electronic clothing, an electronic key, a camcorder, a game console, a Head-Mounted Display (HMD), a flat panel display device, or an electronic album.

9. The electronic device of claim 1, wherein the electronic device is part of at least one of furniture or a building that includes an electronic board, an electronic signature receiving device, or a projector.

10. A method to transmit a first signal in an electronic device which uses an envelope tracking (ET) method, the method comprising:
    determining a digital pre-distortion (DPD) type based on output impedance of a power amplifier;
    generating a DPD variable of the determined DPD type by comparing a second signal coupled by a coupler configured to monitor a third signal output from the power amplifier, and the first signal generated in a modem;
    determining whether an antenna is connected to a transmission path of the electronic device;
    when the antenna is connected to the transmission path, generating first signal using the variable;
    amplifying power of the first signal using the power amplifier; and
    transmitting the first signal.

11. The method of claim 10, wherein the DPD variable comprises a first DPD variable corresponding to output impedance of the power amplifier caused by a network device for calibration or test, and at least one second DPD variable corresponding to output impedance of the power amplifier caused by the antenna.

12. The method of claim 11, wherein the second DPD variable is stored in a storage in at least one form of the second DPD variable and an offset value between the first DPD variable and the second DPD variable.

13. The method of claim 10, wherein generating the first signal comprises:
    selecting one of a plurality of DPD variables based on output impedance of the power amplifier caused by a radio frequency (RF) switch which is located between the power amplifier and the antenna; and
    generating the first signal using the selected DPD variable.

14. The method of claim 10, wherein generating the first signal comprises:
    detecting a phase of the antenna by using a signal which is coupled by the coupler configured to monitor at least one of a signal output from the power amplifier and a signal received via the antenna;
    selecting one of a plurality of DPD variables based on output impedance of the power amplifier caused by an RF switch located between the power amplifier and the antenna, and the phase of the antenna; and
    generating the first signal using selected DPD variable.

15. The method of claim 10, wherein determining the type of DPD variable comprises selecting one of a first DPD variable corresponding to a connection of a network device for a calibration or a test and a transmission path or a second DPD variable corresponding to a connection of an antenna and the transmission path based on the output impedance of the power amplifier.

16. The method of claim 10, wherein determining whether the antenna is connected comprises determining whether the transmission path and the antenna are connected with each other based on whether an RF cable is connected to an RF switch located between the power amplifier and the antenna.

17. The method of claim 10, wherein the electronic device includes at least one of a smartphone, a tablet personal computer (PC), a mobile phone, a video phone, an electronic book reader, a desktop PC, a laptop PC, a netbook computer, a Personal Digital Assistant (PDA), a Portable Multimedia Player (PMP), an MP3 player, an accessory, an electronic appcessory, a camera, a wearable device, a wrist watch, a refrigerator, an air conditioner, a cleaner, an artificial intelligence robot, a TV, a Digital Video Disk (DVD) player, a stereo, an oven, a microwave oven, a washing machine, an electronic bracelet, an electronic necklace, an air cleaner, an electronic album, a medical device, a navigation device, a satellite signal receiver, an Event Data Recoder (EDR), a Flight Data Recoder (FDR), a set-top box, a TV box, an electronic dictionary, an automotive infotainment device, electronic equipment for a ship, avionics, a security device, electronic clothing, an electronic key, a camcorder, a game console, a Head-Mounted Display (HMD), a flat panel display device, or an electronic album.

18. The method of claim 10, wherein the electronic device is part of at least one of furniture or a building that includes an electronic board, an electronic signature receiving device, or a projector.

* * * * *